A. & A. M. McDOUGALL.
VESSEL.
APPLICATION FILED JAN. 23, 1912.
1,122,782.
Patented Dec. 29, 1914.
2 SHEETS—SHEET 1.
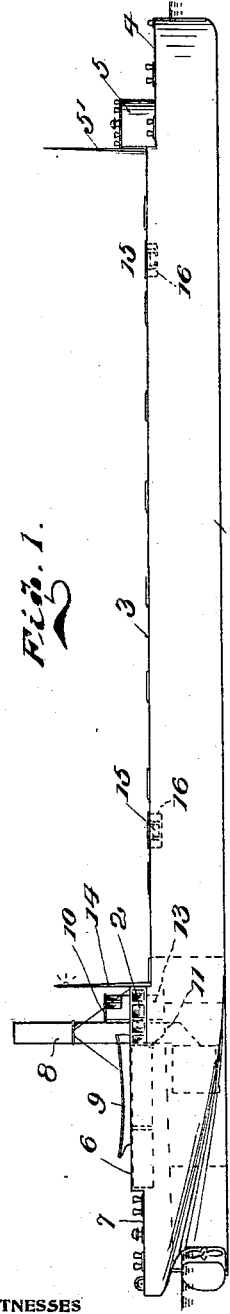
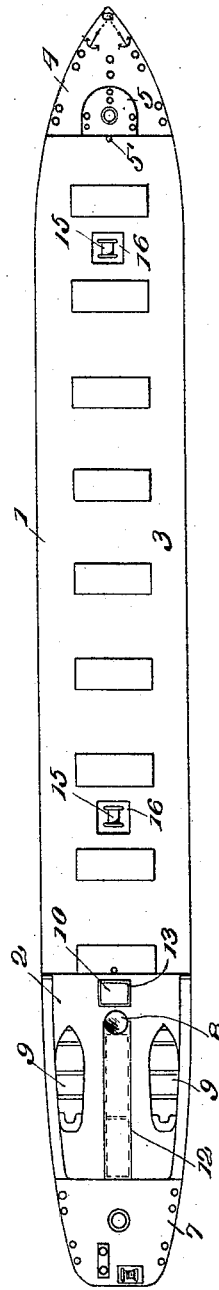
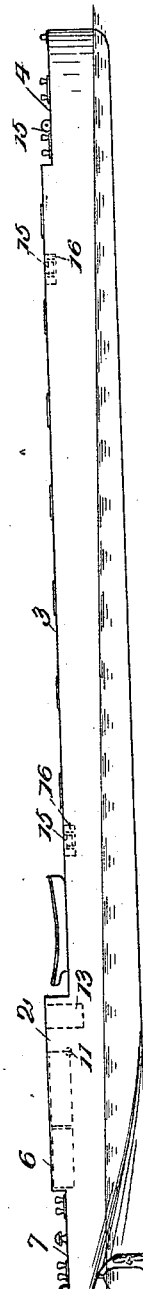
WITNESSES
INVENTORS
BY
ATTORNEY A. & A. M. McDOUGALL.
VESSEL.
APPLICATION FILED JAN. 23, 1912.

1,122,782.

Patented Dec. 29, 1914.
2 SHEETS—SHEET 2.

UNITED STATES PATENT OFFICE.

ALEXANDER McDOUGALL AND ALEXANDER MILLER McDOUGALL, OF DULUTH, MINNESOTA.

VESSEL.

1,122,782. Specification of Letters Patent. Patented Dec. 29, 1914.

Application filed January 23, 1912. Serial No. 672,967.

*To all whom it may concern:*

Be it known that we, ALEXANDER McDOUGALL and ALEXANDER MILLER McDOUGALL, citizens of the United States, residing at Duluth, in the county of St. Louis and State of Minnesota, have invented certain new and useful Improvements in Vessels, of which the following is a specification, reference being had therein to the accompanying drawing.

Our invention relates to improvements in vessels, and pertains more particularly to vessels for navigating waters of moderate depth, such as canals, rivers and the like, which are spanned by numerous bridges or road-ways and also larger bodies of water as seagoing vessels.

The object is to provide a vessel adapted to such varied navigation requirements that is simple in construction and one readily and quickly adjusted to meet such requirements and that without jeopardizing the seaworthiness of the vessel or its carrying capacity.

Another object is to produce a vessel capable of adjustment to the minimum vertical requirements in proportion to its hull capacity and still maintain its seagoing advantages.

Still another object is to produce a vessel with the greatest depth of side possible to give longitudinal strength and keep off the waves when at sea and provide the greatest cubical capacity in a strong water-tight hull having superstructures capable of minimum vertical adjustment when passing under bridges either light or loaded, thus producing a vessel that may be loaded some deeper when in a coasting trade than permissible in restricted water as described.

Figure 4:
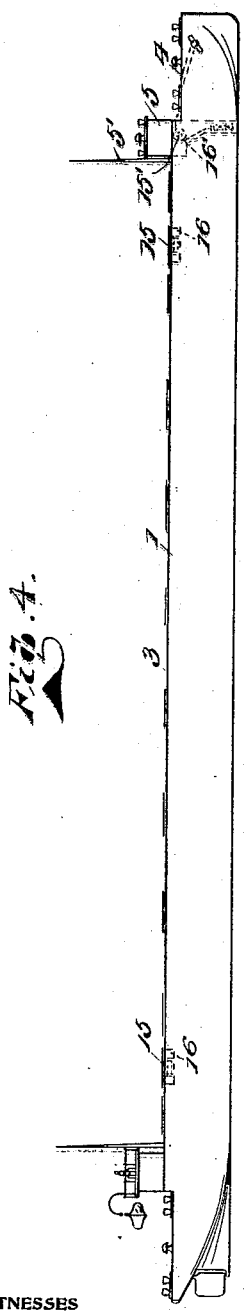
Figure 5:
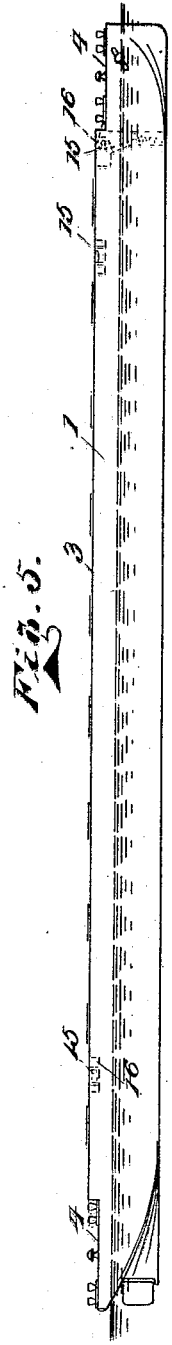
Figure 6:
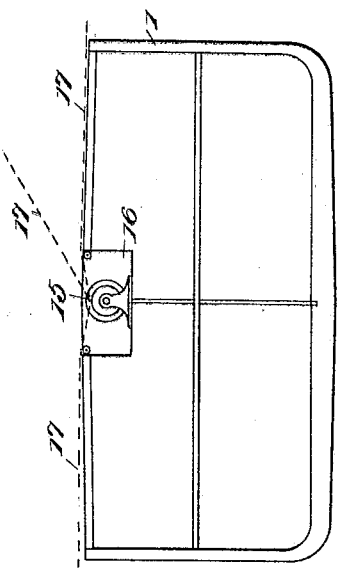

In the accompanying drawings forming part of our specification; Figure 1 is a side elevation of our improved construction in the form of a self-propelled vessel as she would appear loaded and prepared for a sea voyage. Fig. 2 is a plan view of the same. Fig. 3 is a side elevation of the vessel light and prepared for passage within a canal beneath low structures such as bridges and the like. Fig. 4 is a modified form of our improved construction as applied to a tow barge showing her prepared for a sea voyage. Fig. 5 is a similar view of the tow-barge loaded and prepared to pass under bridges or the like over a canal or river. Fig. 6 is a transverse sectional view of the hull of the vessel showing the relative position of the winch wells.

In the case of the steamer, 1 represents the hull of the vessel, which at its stern is necessarily surmounted by a comparatively low superstructure 2 as crew's quarters and for the housing of certain of the working parts of the vessel.

3 represents the major portion of the upper deck of the hull of the vessel which near the forward end is stepped down forming the depressed or stepped deck 4 upon which are mounted and permanently fixed the smaller working elements such as timber heads, chocks, windlasses and the like for use in controlling the movements of the vessel when mooring or being towed, and which elements do not extend above a plane level with the deck 3 so as to form no obstruction whatever in the way of the vessel passing beneath a low structure. Thus this stepped working deck may prove sufficient for all ordinary purposes forward, in the manipulation and navigation of the vessel. However, in the event of a higher working deck being desired, we install for such purpose a turret or small superstructure 5, securely fixed upon either the deck 3 or the deck 4, as desired, and mount upon it the required capstan and other manipulating elements for seagoing purposes. This turret and its appurtenances are made portable and vertically adjustable in any desired manner, preferably made in sections and capable of being stored away either within the hull of the vessel or upon the deck 4 by the use of the mast 5′ and suitable block and tackle when the vessel is being navigated under bridges. The upper deck 6 of the superstructure 2 is also stepped at its rear portion 7, similar to and for the same purpose as the forward stepped deck 4, but this being the stern of the vessel in which is located and permanently carried the propelling mechanism of the vessel, the variation of draft is never so great as at the opposite end or bow, thus the extreme clearance is not required. As for instance, when the vessel is light the bow of the hull proper will be much higher out of the water than the stern, requiring greater clearance of head room at the bow than at the stern when navigating light under bridges which is clearly apparent in Fig. 3 of the drawings.

When the vessel is prepared for open water navigation, above the deck 6 of the superstructure 2 is supported the stack 8, life rafts or boats 9 and pilot house 10. The stack 8 is preferably hinged at 11, whereby it may be tipped over backward and lowered into the recess 12 in the superstructure 2 for the purpose and thus become flush with the deck 6. The pilot house 10 may be removed in a similar manner to the turret 5 or if preferred, may be lowered vertically into a suitably prepared compartment 13 by the use of block and tackle in connection with the movable mast 14 and the life boats or other elements removed from the deck 6 and placed either within the hull or upon the upper deck 3 thereof when it is desired to navigate restricted waters as referred to.

Mooring winches or windlasses 15 are suitably installed in depressions or wells 16 within the upper deck or hull in such a manner as not to project above the deck and yet materially assist in the mooring manipulations of the vessel by lines 17 leading in any desired direction and such wells or depressions may be covered by hatches when at sea.

In Figs. 4 and 5 is illustrated two barges of our improved construction having a stepped working deck at both ends of the vessel and also removable turrets at both ends whereby the barge may be quickly arranged for seagoing purposes or for restricted navigation as demanded. And when navigating restricted waters as described, the advantages of having the mooring elements mounted upon an open deck as illustrated, is very evident as for instance, in passing through a canal lock. When the water is at its lowest stage in the lock the mooring lines from the vessel must extend to a point often twenty or thirty feet above the deck of the vessel and in which case lines reaching to the opposite side of the vessel to that of the dock are resorted to. Then again the reverse condition exists when the deck of the vessel is considerably above the lock during the higher stages of water, all of which demands a free, open and accessible arrangement of mooring elements and yet vertically unobstructive as produced in our improved vessel.

Thus it is seen that we produce a vessel of great carrying capacity with all necessary seaworthiness and at the same time one that can be quickly transformed into a vessel of light draft, free from superstructure and admirable for inland navigation which will enable such vessels to unobstructably carry on a combined canal and lake-wise line of transportation.

Having thus described our invention, what we claim and desire to secure by Letters Patent is:

1. A vessel of the character described, comprising a hull, vertically removable superstructures at one or both ends of the hull and a depressed working deck supporting means for controlling the vessel whereby said means do not project above the upper deck of the vessel.

2. A vessel, comprising a hull, means for propelling the hull, vertically removable superstructures at one or both ends of the hull and a fixed working deck considerably below the level of the upper deck whereby the greatest clearance possible may be provided against the vessel having to pass beneath low fixed structures.

3. A vessel comprising a hull having a depressed or stepped working deck at the forward end of the hull and vertically removable sectional superstructures at the opposite end of the hull to enable the vessel to navigate both upon rough waters and to pass under low bridges in more quiet and confined waters such as canals and the like.

4. A navigable vessel, comprising a hull having stepped or depressed working decks at the forward and rear ends thereof and removable superstructures carried upon both ends of the vessel.

5. A vessel of the character described, comprising a hull, a vertically removable superstructure, and a depressed working deck and means carried by the deck for controlling the vessel and in a plane below the main deck.

6. A vessel of the character described, comprising a hull, a vertically removable superstructure, a movable smoke-stack, a depressed deck and means carried by the deck for controlling the vessel and in a plane below the upper deck.

7. A navigable vessel, comprising a hull having an upper deck, a depressed forward deck, a rear raised deck propelling means below the raised deck, and a depressed rear deck.

8. A vessel comprising a hull having an upper deck a depressed forward working deck, a rear raised deck, and a depressed rear deck below a plane with the upper deck.

9. A vessel, comprising a hull having an upper deck, a depressed forward deck, a rear raised upper deck, propelling power below the rear raised deck, a vertically movable superstructure and a depressed deck in rear of the raised deck.

10. A vessel comprising a hull having an upper deck, a depressed forward working deck, a rear raised upper deck having propelling power below the same, a smoke stack adapted to fold into a depression in the rear raised deck, a vertically movable superstructure, and a depressed deck in rear of the raised deck.

11. A navigable vessel comprising a hull having an upper deck, a depressed forward working deck, a movable superstructure carried by the forward depressed deck, a raised rear deck, propelling means below said raised deck, a vertically adjustable superstructure above the raised deck, a smoke stack carried below the raised deck and adapted to be folded in a depression therein, and a rear depressed working deck.

12. A navigable vessel, comprising a hull, a stepped or depressed working deck within the upper wall of the hull and at both ends thereof, a removable superstructure at each end of the hull and vertically removable means upon the deck of the hull for removing the superstructures.

In testimony whereof we hereunto affix our signatures in the presence of two witnesses.

ALEXANDER McDOUGALL,
ALEXANDER MILLER McDOUGALL.

Witnesses:
NORMAN E. LANLAND.
S. GEO. STEVENS.

Copies of this patent may be obtained for five cents each, by addressing the "Commissioner of Patents, Washington, D. C."